(12) United States Patent
Clarke et al.

(10) Patent No.: US 11,701,531 B2
(45) Date of Patent: Jul. 18, 2023

(54) ROBOTIC FIRE EXTINGUISHING DEVICE AND HANDLING METHOD

(71) Applicant: OCADO INNOVATION LIMITED, Hatfield (GB)

(72) Inventors: Paul Clarke, Hatfield (GB); Andrew John Ingram-Tedd, Hatfield (GB); Matthew Whelan, Hatfield (GB); Pawel Karolinczak, Hatfield (GB)

(73) Assignee: OCADO INNOVATION LIMITED, Hatfield (GB)

(*) Notice: Subject to any disclaimer, the term of this patent is extended or adjusted under 35 U.S.C. 154(b) by 0 days.

(21) Appl. No.: 15/998,962

(22) PCT Filed: Feb. 28, 2017

(86) PCT No.: PCT/EP2017/054670
§ 371 (c)(1),
(2) Date: Aug. 17, 2018

(87) PCT Pub. No.: WO2017/148963
PCT Pub. Date: Sep. 8, 2017

(65) Prior Publication Data
US 2019/0240517 A1    Aug. 8, 2019

(30) Foreign Application Priority Data

Feb. 29, 2016  (GB) .................................... 1603518

(51) Int. Cl.
*A62C 3/00*    (2006.01)
*A62C 27/00*    (2006.01)
*B65G 1/04*    (2006.01)

(52) U.S. Cl.
CPC .............. *A62C 3/002* (2013.01); *A62C 27/00* (2013.01); *B65G 1/0464* (2013.01); *B65G 2207/22* (2013.01)

(58) Field of Classification Search
CPC ......... A62C 3/002; A62C 27/00; A62C 3/004; A62C 3/00; A62C 33/04; A62C 3/0292; B65G 1/0464; B65G 2207/22
See application file for complete search history.

(56) References Cited

U.S. PATENT DOCUMENTS 4,488,603 A  *  12/1984  Schmittmann .........  A62C 27/00
169/24
5,707,199 A  *  1/1998  Faller ........................ E04H 6/24
414/239

(Continued)

FOREIGN PATENT DOCUMENTS

CN    102275475    *  10/2011    ............... B60F 1/04
CN    102921138 A    2/2013

(Continued)

OTHER PUBLICATIONS

International Search Report (PCT/ISA/210) dated May 17, 2017, by the European Patent Office as the International Searching Authority for International Application No. PCT/EP2017/054670.

(Continued)

*Primary Examiner* — Christopher R Dandridge
(74) *Attorney, Agent, or Firm* — Buchanan Ingersoll & Rooney PC

(57) ABSTRACT

A fire extinguishing robotic service device is described for use with a robotic picking system grid. The fire extinguishing robotic service device is configured for driving to any location on the grid in order to extinguish a fire. The service device may also be provided with a camera sensor to locate the fire.

7 Claims, 13 Drawing Sheets

(56) References Cited

U.S. PATENT DOCUMENTS

| | | | | |
|---|---|---|---|---|
| 7,909,112 B2* | 3/2011 | Decker | ............... | B66F 9/07563 169/24 |
| 8,381,826 B2* | 2/2013 | Al-Azemi | ............... | A62C 27/00 169/52 |
| 9,504,862 B2 | 11/2016 | Sempere Rodriguez et al. | | |
| 2012/0265333 A1* | 10/2012 | Ariizumi | ................ | B66F 9/063 700/218 |
| 2015/0307276 A1* | 10/2015 | Hognaland | ............... | B66F 9/06 700/218 |
| 2016/0030780 A1 | 2/2016 | Sempere Fernandez et al. | | |
| 2016/0194151 A1 | 7/2016 | Lindbo et al. | | |

FOREIGN PATENT DOCUMENTS

| | | | | | |
|---|---|---|---|---|---|
| CN | 203777559 | U | | 8/2014 | |
| CN | 104298162 | | * | 1/2015 | ........... G05B 19/048 |
| CN | 103171851 | B | | 5/2015 | |
| CN | 205274386 | | * | 6/2016 | ............. A62C 31/02 |
| CN | 205274386 | U | | 6/2016 | |
| CN | 106178348 | A | | 12/2016 | |
| DE | 0440883 | | * | 8/1991 | ............. A62C 3/002 |
| DE | 202014003113 | U1 | | 4/2014 | |
| EP | 0440883 | | * | 8/1991 | ............. A62C 3/002 |
| EP | 0440883 | A1 | | 8/1991 | |
| EP | 2460563 | A2 | | 6/2012 | |
| EP | 3119703 | B1 | | 9/2020 | |
| GB | 2528573 | B | | 2/2017 | |
| JP | H05-111545 | A | | 5/1993 | |
| JP | H05111545 | | * | 5/1993 | ............... A62C 3/07 |
| JP | H09-221201 | A | | 8/1997 | |
| JP | H09226909 | A | | 9/1997 | |
| JP | 2011121771 | A | | 6/2011 | |
| TW | 200603858 | A | | 2/2006 | |
| TW | M452046 | U | | 5/2013 | |
| WO | 2013117784 | A1 | | 8/2013 | |
| WO | 2014075937 | A1 | | 5/2014 | |
| WO | 2014090684 | A1 | | 6/2014 | |
| WO | 2015/019055 | A1 | | 2/2015 | |
| WO | 2015104263 | A2 | | 7/2015 | |
| WO | 2015124610 | A1 | | 8/2015 | |
| WO | 2015/140216 | A1 | | 9/2015 | |
| WO | 2015/185628 | A2 | | 12/2015 | |

OTHER PUBLICATIONS

Search Report dated Jul. 18, 2017, by the United Kingdom Intellectual Property Office of in corresponding United Kingdom Patent Application No. GB1703257.4. (6 pages).

Written Opinion (PCT/ISA/237) dated May 17, 2017, by the European Patent Office as the International Searching Authority for International Application No. PCT/EP2017/054670.

Office Action (Summons to attend oral proceedings) dated Dec. 9, 2020, by the European Patent Office in corresponding European Patent Application No. 17709612.0. (13 pages).

The extended European Search Report dated Jan. 20, 2022, by the European Patent Office in corresponding European Application No. 21201229.8 (19 pages).

Office Action (Communication of Notices of Opposition) dated Nov. 21, 2022, by the European Patent Office in corresponding European Patent Application No. 17709612.0. (1 page).

Article in Ingenioren No. 41 (Effektivt elektronisk lager), with a machine English translation. (12 pages).

Notice of Opposition issued on Nov. 15, 2022, by the European Patent Office in European Application No. 17709612.0. (45 pages).

Web-page "Airport crash tender" https://en.wikipedia.org/wiki/Airport_crash_tender.

Webpage "Fire train" https://en.wikipedia.org/wiki/Fire_train.

Webpage "History of the RAF Firefighter" https://firemuseum.uk/timeline/.

YouTube video "Kilburn's Fire Extinguisher Ball", https://www.youtube.com/watch?v=MzioHaNA-rw.

* cited by examiner

ROBOTIC FIRE EXTINGUISHING DEVICE AND HANDLING METHOD

The present invention relates to a robotic picking system device and method. More specifically but not exclusively, it relates to a robotic fire extinguishing device for use in a robotic picking system.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above, removing the need for aisles between the rows and allowing more containers to be stored in a given space.

Methods of handling containers stacked in rows are well known in the art. PCT Publication No WO2015/185628A (Ocado) describes a storage and fulfillment system in which stacks of containers are arranged within a frame structure. The containers are accessed by load handling devices operative on tracks located on the top of the frame structure. The load handling devices lift containers out from the stacks, multiple load handling devices co-operating to access containers located in the lowest positions of the stack. One form of robotic load handling device is described in PCT Patent Publication No WO2015/019055 (Ocado) where each robotic load handler only covers one grid space of the frame work structure, thus allowing higher density of load handlers and thus higher throughput of a given size system.

In some implementations of such bin handling systems, there can be a very large number of robotic load handling devices running on a single grid. These load handling devices can experience problems from time to time and require repair or other intervention in order to return to useful service. PCT Publication No WO2015/140216 (Ocado), herein incorporated by reference details a service device for removing malfunctioning devices from the grid.

In some implementations of such bin handling systems, there can be a very large number of robotic load handling devices running on a single grid. The high density storage of large amounts of combustible materials in the grid represents a fire hazard. The load handling devices can experience problems from time to time and electrical or other faults therein may ignite the contents of one or more storage bin.

Furthermore, there may be spillages or a build-up of dirt or dust or oil on the grid which in the event of a spark being generated by a load handling device as a result of an electrical fault, or friction between the grid and the load handling or service device, or collisions between one or more load handling device or service device or otherwise may cause a fire to start.

It is a disadvantage of the prior art systems described above that in order to extinguish a fire within the grid, human fire fighters must access the grid. For the fire fighters' safety it is necessary to stop all robotic load handlers on the grid before human fire fighters are allowed access.

Any delay between detection of a fire and the deployment of human fire fighters can cause unnecessary damage to the grid and its contents.

False alarms where no fire is present but which have caused all of the robotic handlers on the grid to be stopped to allow human fire fighters to safely enter the grid are costly and damage the productivity of the system.

A need exists for a robotic fire fighter which can be rapidly and accurately deployed when a fire detector is activated without the need to stop all the robotic load handlers on the grid.

According to the invention there is provided a service device for operation on a robotic picking system comprising two substantially perpendicular sets of rails forming a grid and having robotic load handling devices thereon, the service device comprising a body mounted on two sets of wheels, the first set of wheels being arranged to engage with at least two rails of the first set of rails, the second set of wheels being arranged to engage with at least two rails of the second set of rails, the first set of wheels being independently moveable and driveable with respect to the second set of wheels such that only one set of wheels is engaged with the grid at any one time thereby enabling movement of the service device along the rails to any point on the grid by driving only the set of wheels engaged with the rails, the service device being further provided with: fire extinguishing means.

In another aspect the invention relates to a method of using of the service device to extinguish a fire in a robotic picking system.

According to the invention there is further provided a method of extinguishing a fire in a storage system, the system comprising containers located in stacks within a framework, the framework comprising a grid network of tracks above the stacks of containers, the tracks carrying load handling devices operable thereon to remove containers from the stacks, the system further comprising at least one robotic service device, the method comprising the steps of: detecting a fire in a container in the storage system; moving a service device in to a location above the detected fire; deploying fire extinguishing material from the service device in the direction of the fire; and extinguishing or slowing the progress of the fire.

Preferred features of the invention are defined in the claims.

In this way, the present invention overcomes the problems of the prior art and provides a system and method of increasing the reliability and reducing the overall cost of large bin handling systems by the deployment of one or more automated fire extinguishing service robots.

Figure 1:
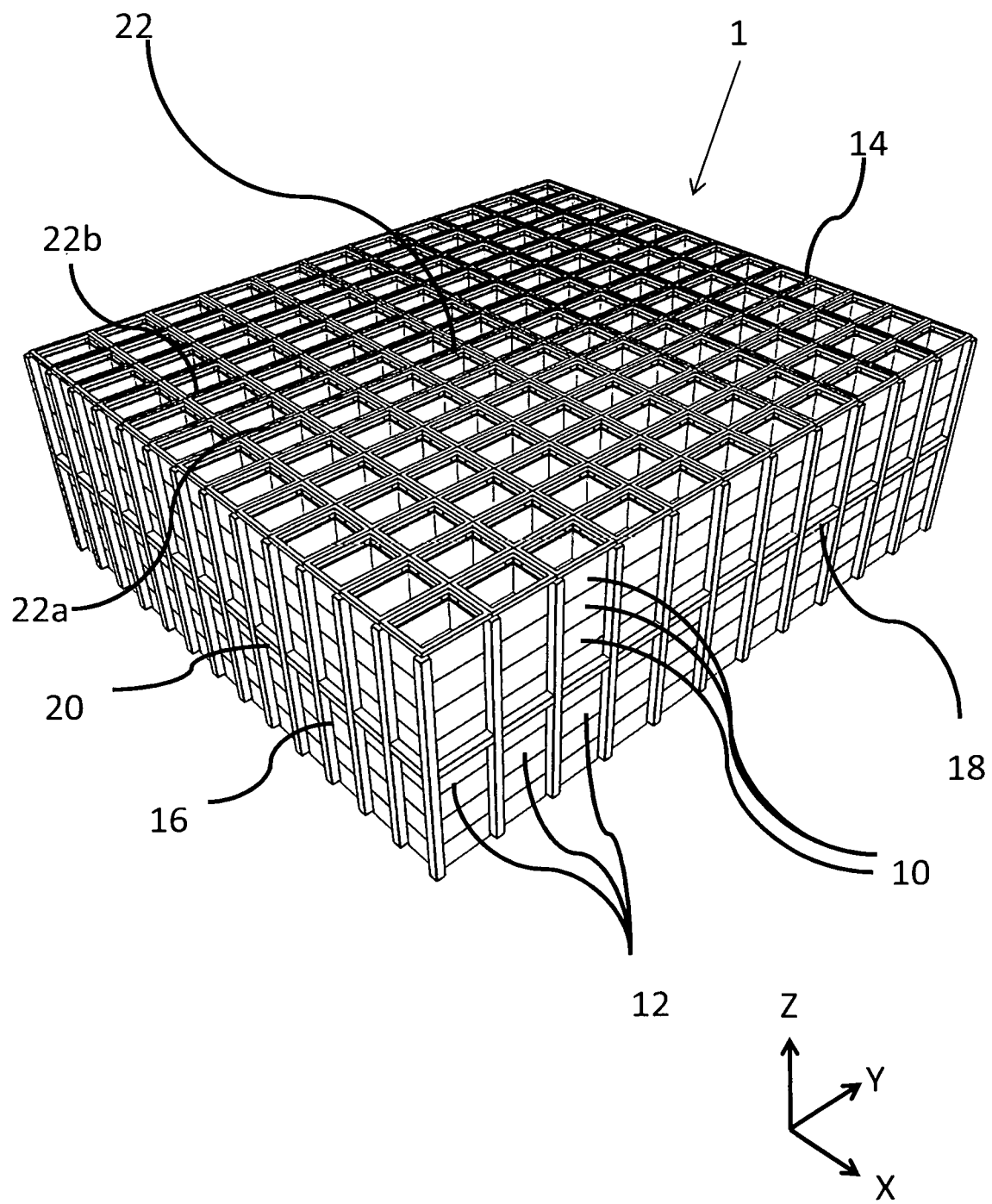
FIG. 1 is a schematic perspective view of a frame structure for housing a plurality of stacks of bins in a known storage system.
Figure 2:
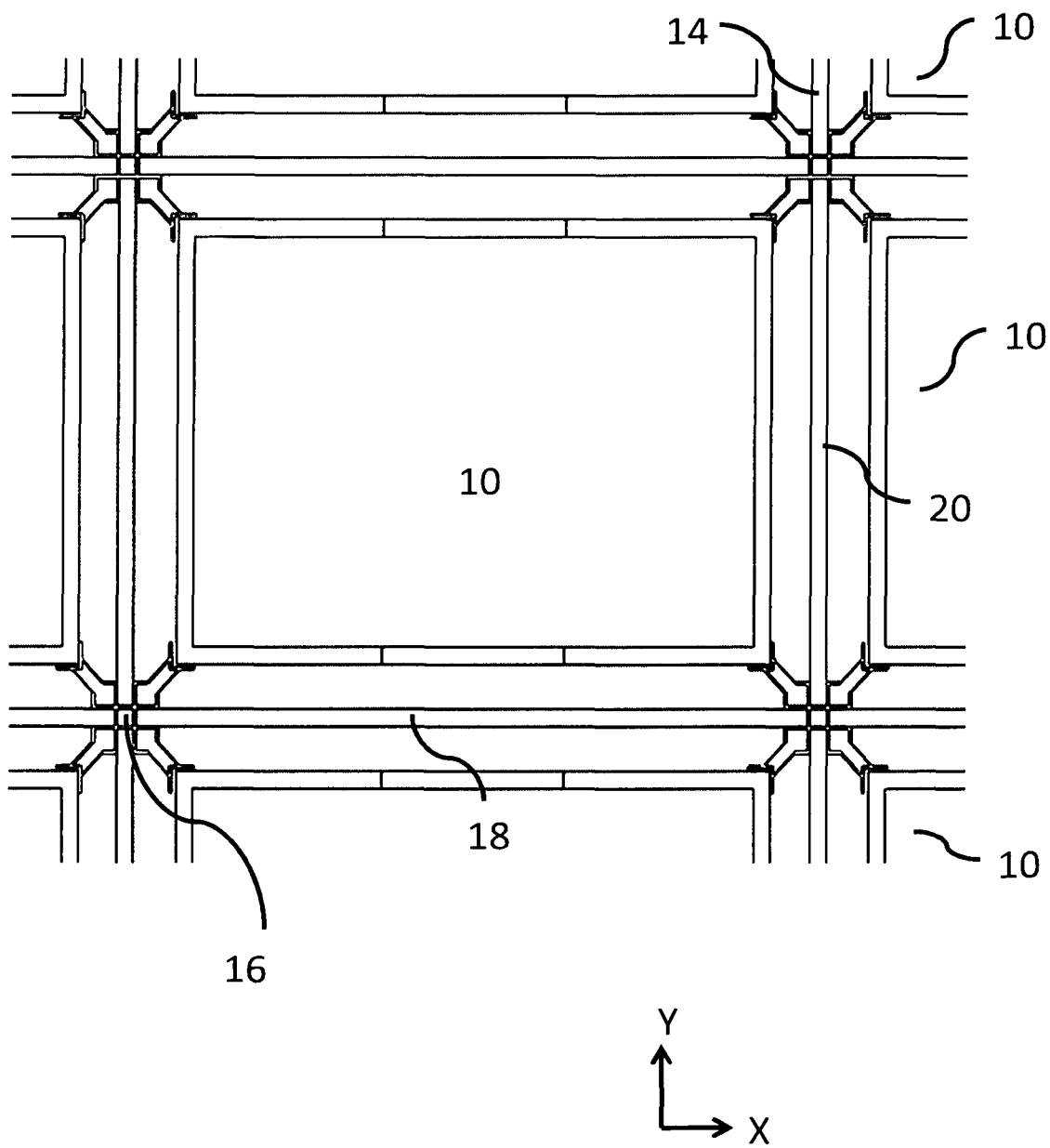
FIG. 2 is a schematic plan view of part of the frame structure of FIG. 1.
Figure 3A:
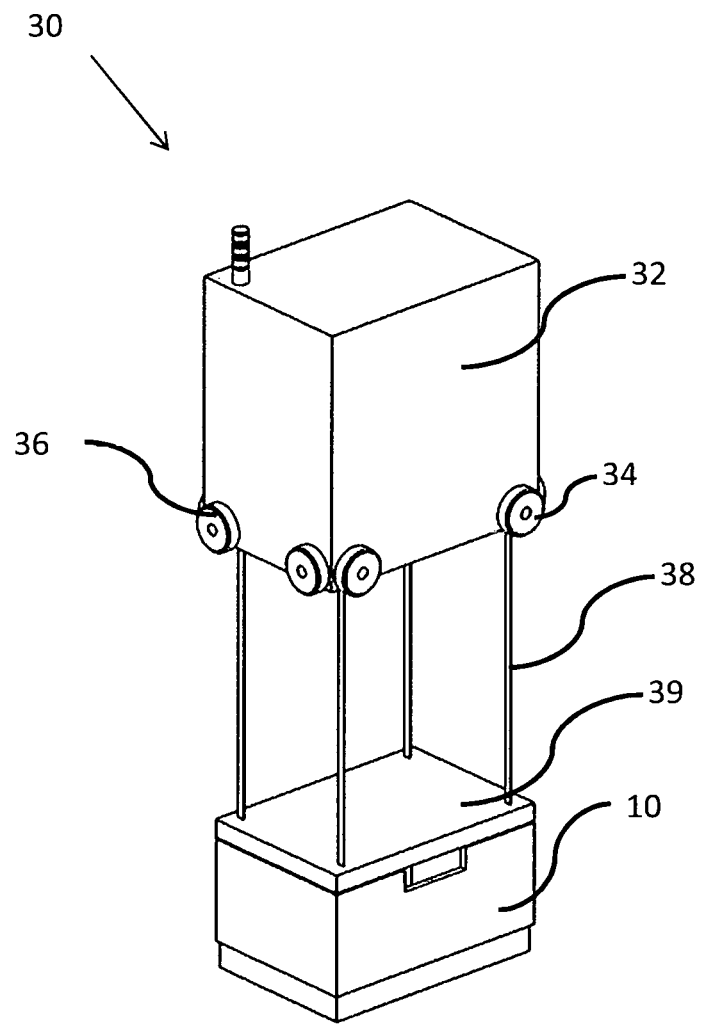
Figures 3B, 3C:
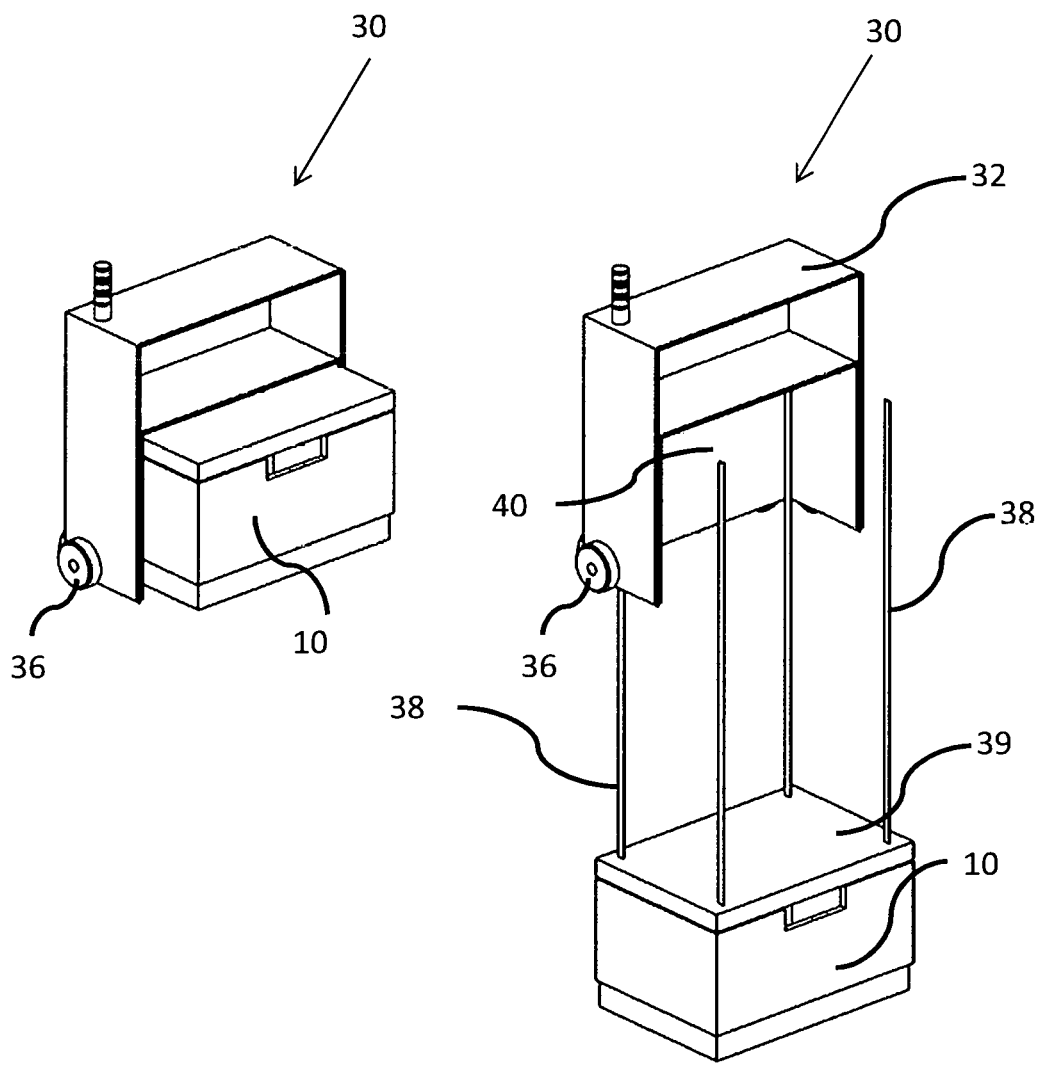
Figure 4:
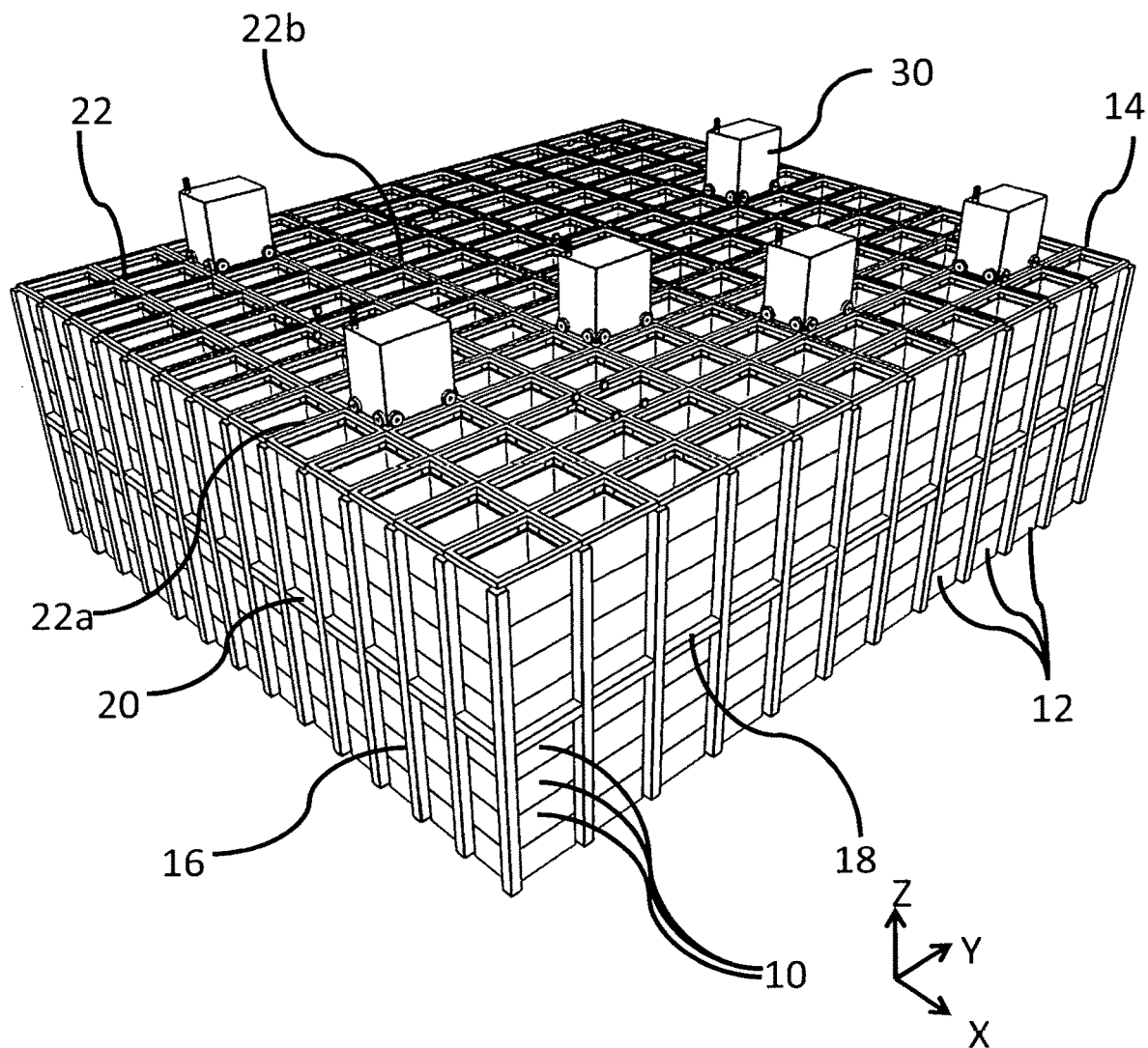
Figure 5:
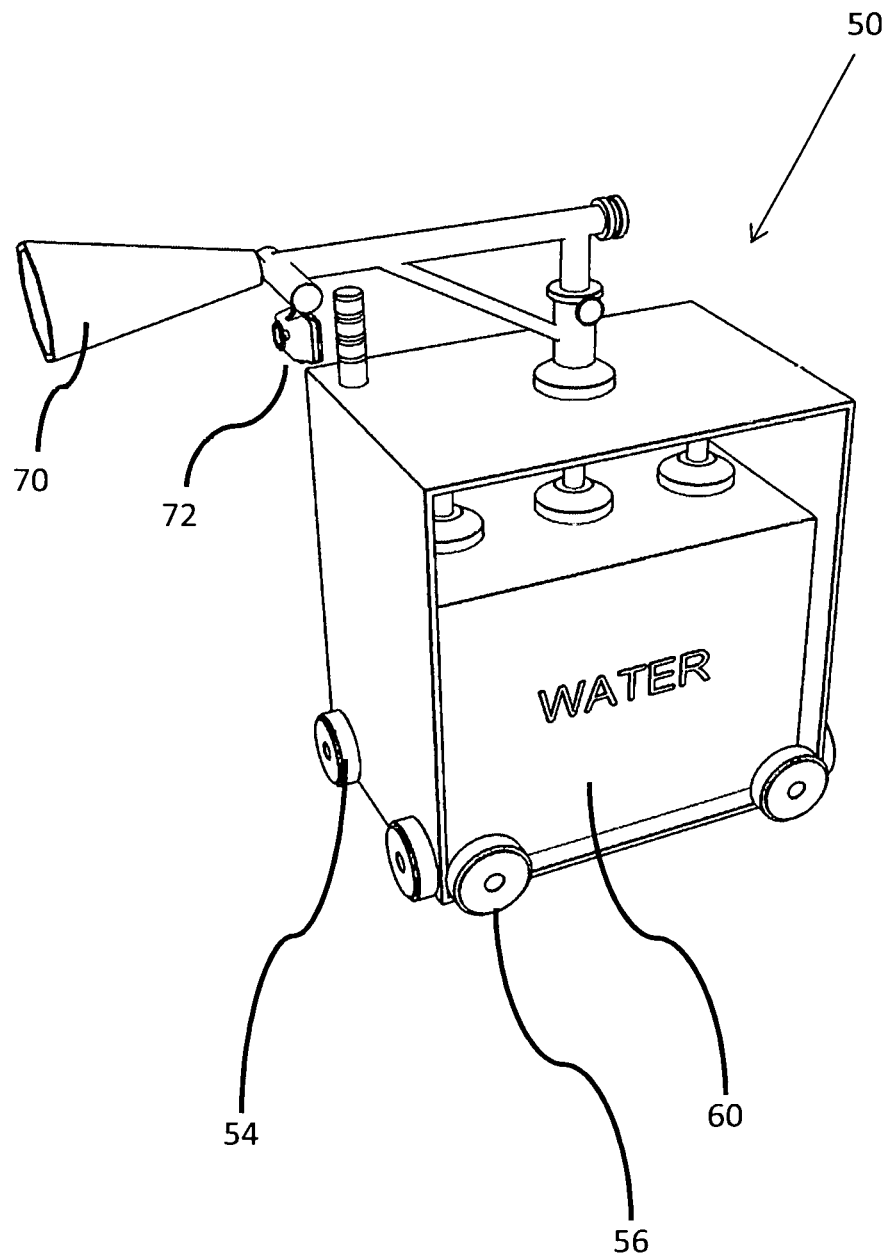
Figure 6:
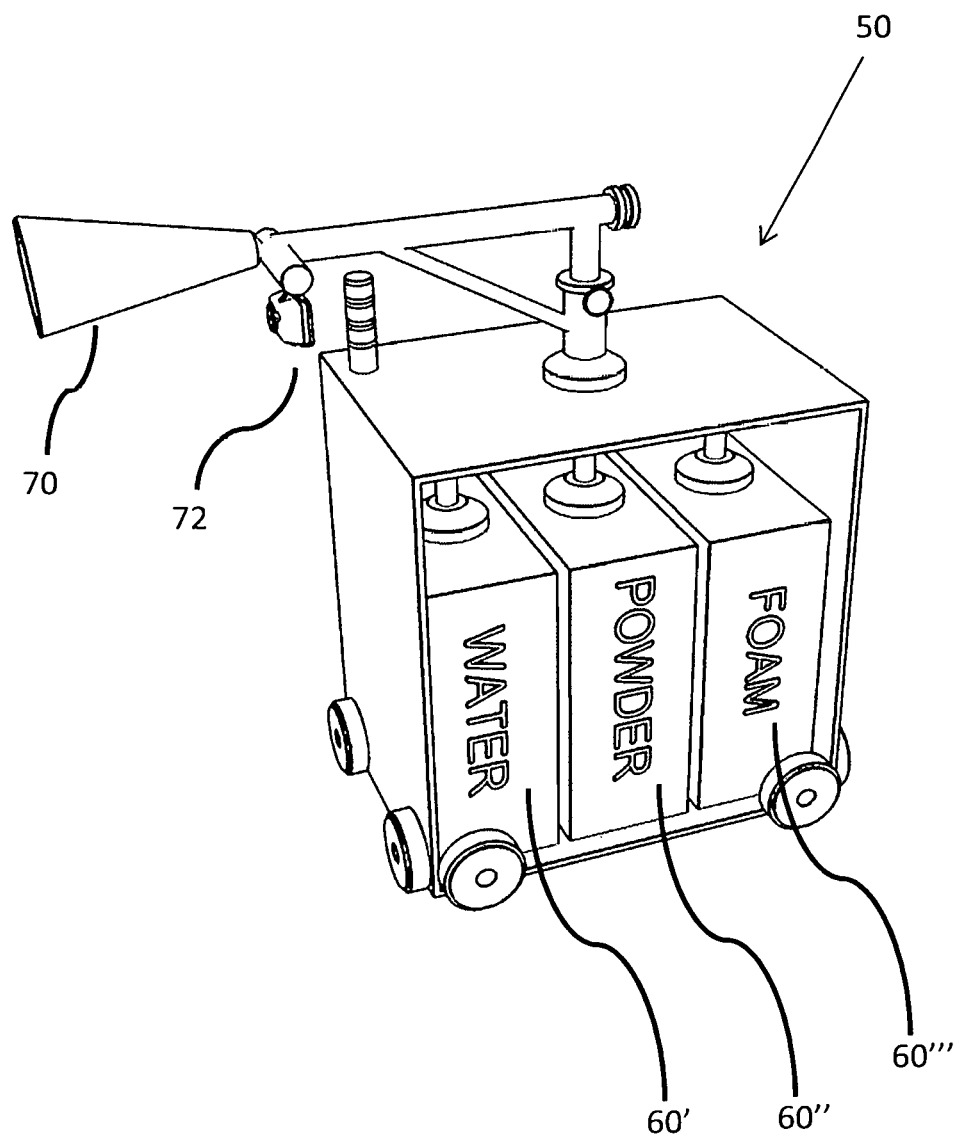
Figure 7:
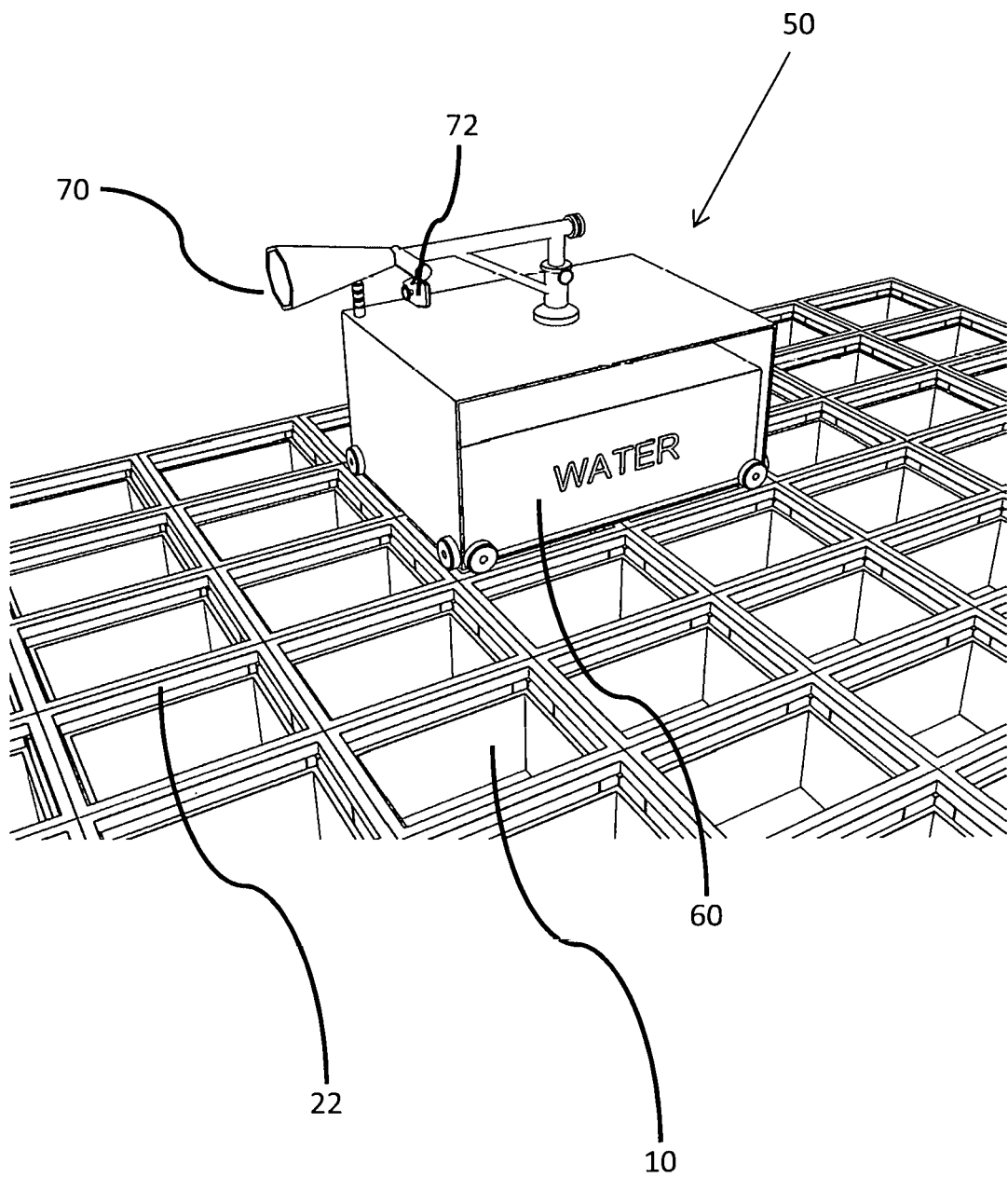
Figure 8:
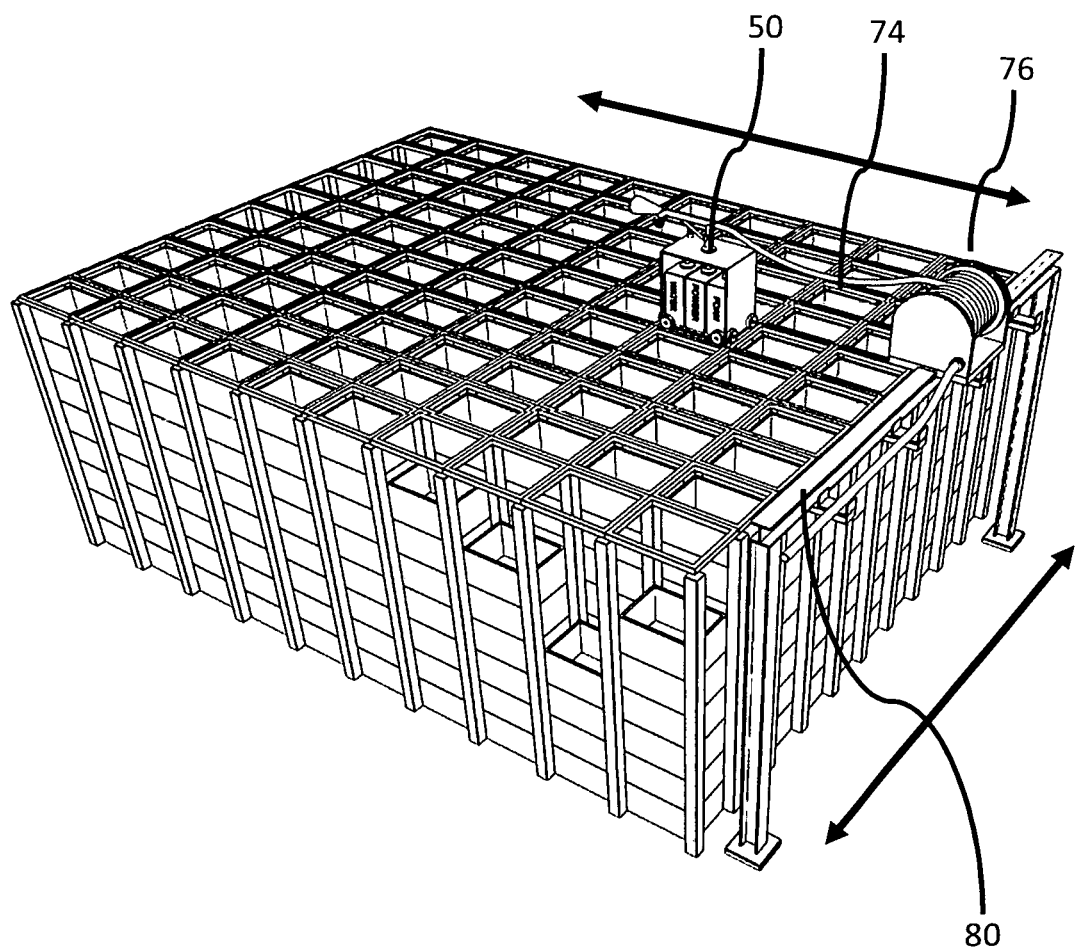
Figure 9:
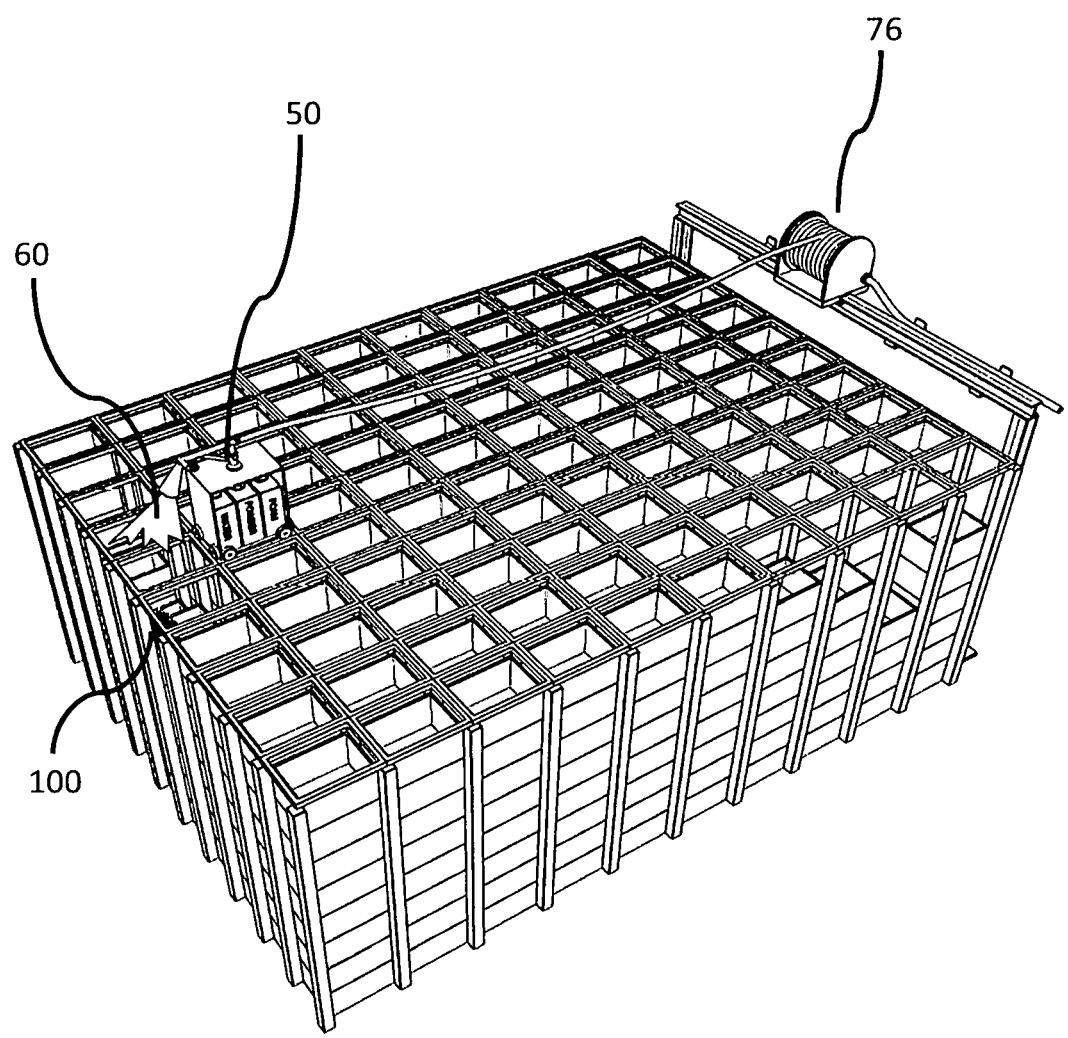
Figure 10:
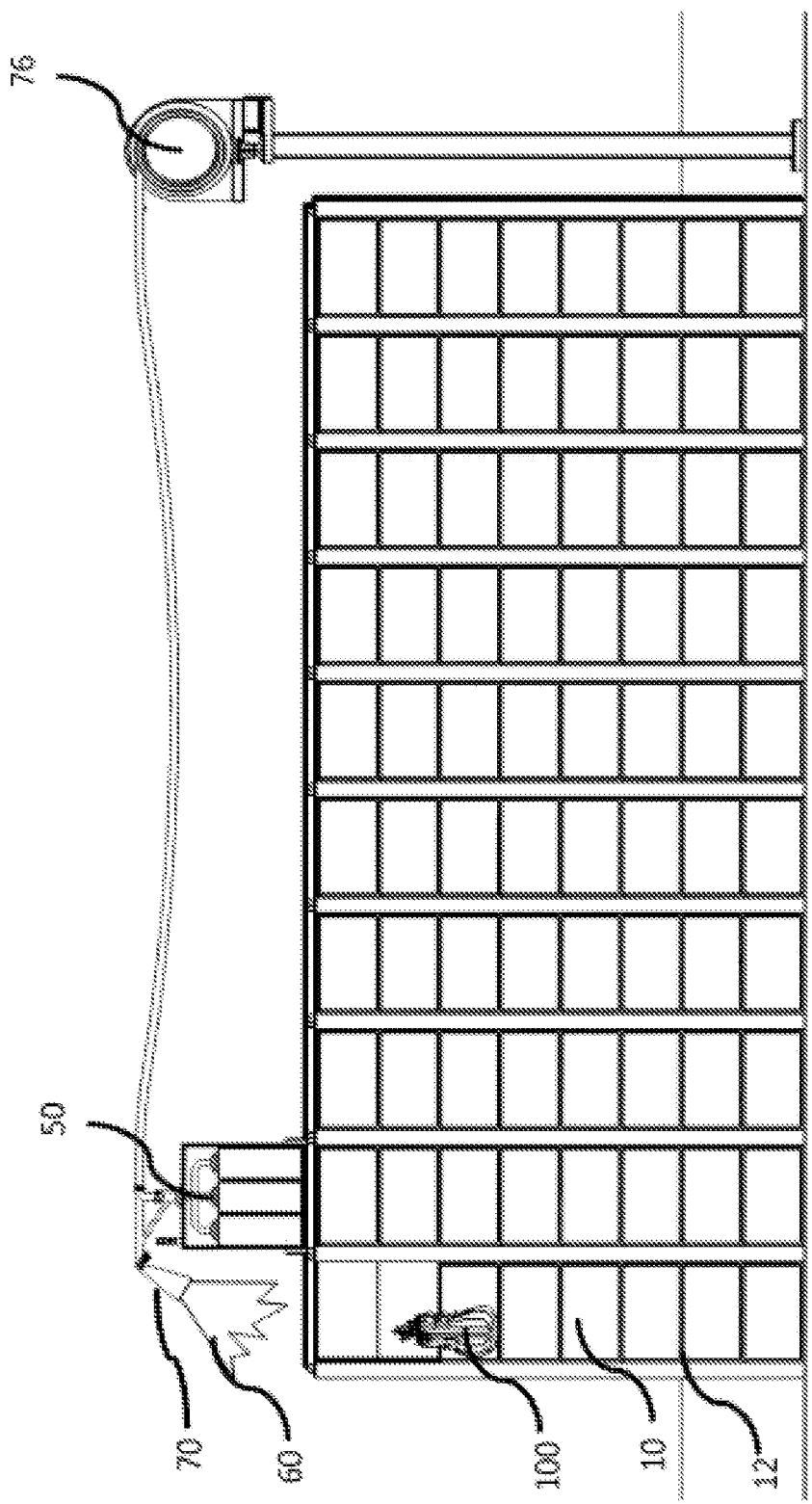
Figure 11:
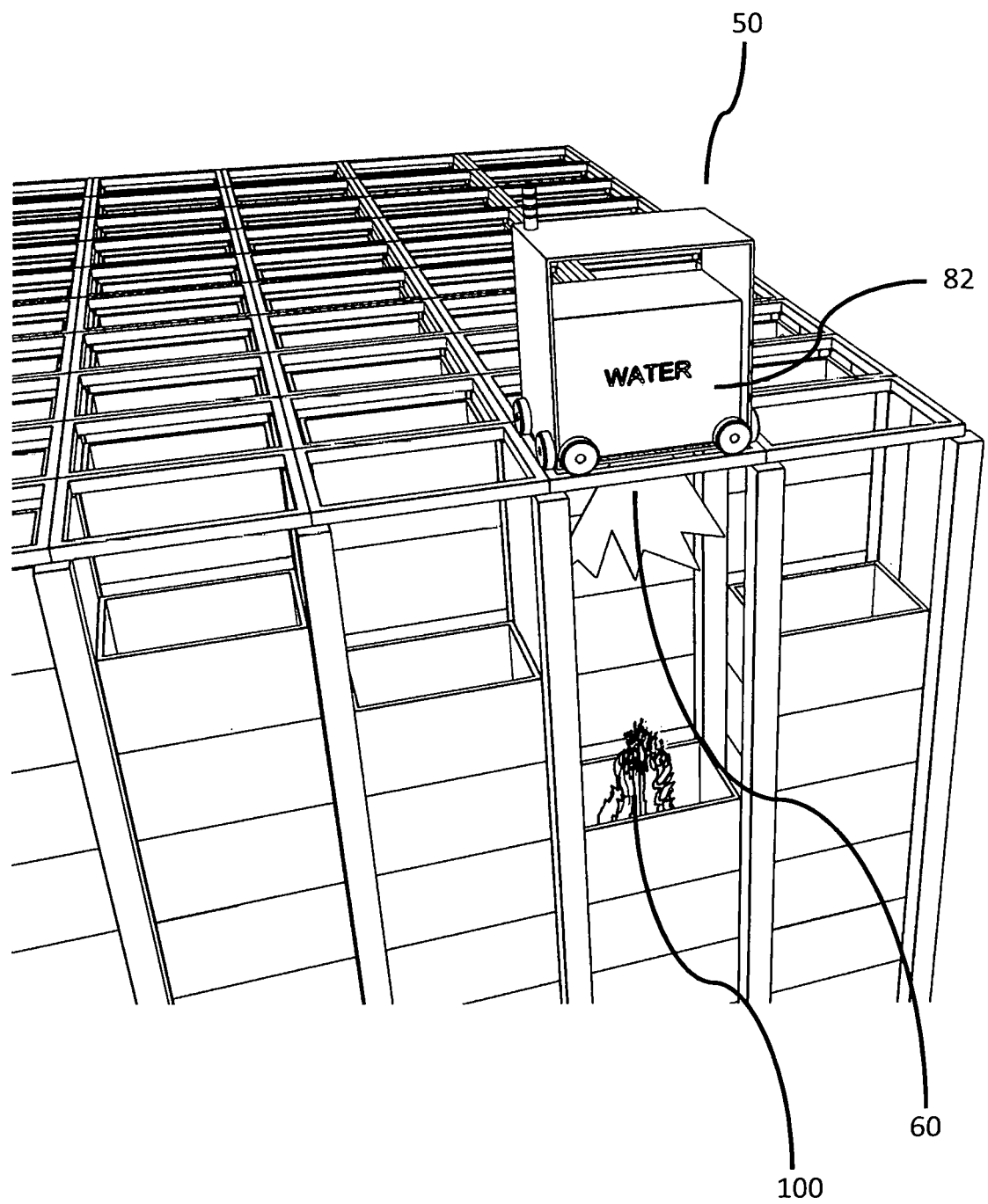
Figure 12A:
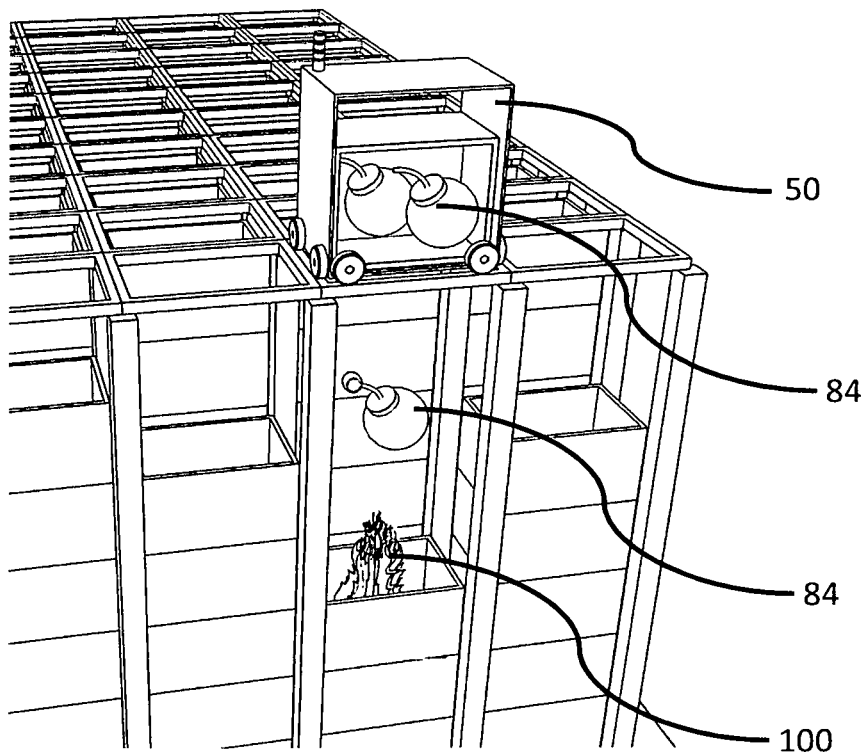
Figure 12B:
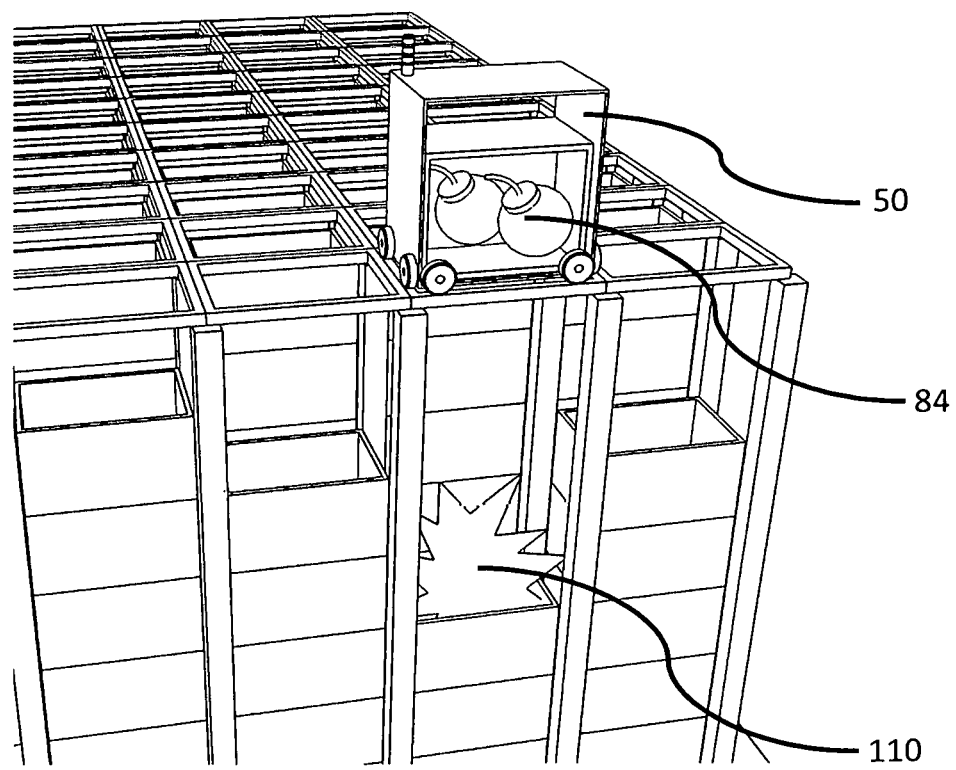

FIGS. 3(a) and 3(b) are schematic perspective views, from the rear and front respectively, of one form of robotic load handling device for use with the frame structure of FIGS. 1 and 2, and FIG. 3(c) is a schematic perspective view of the known load handler device in use lifting a bin;

FIG. 4 is a schematic perspective view of a known storage system comprising a plurality of load handler devices of the type shown in FIGS. 3(a), 3(b) and 3(c), installed on the frame structure of FIGS. 1 and 2, together with a robotic service device in accordance with one form of the invention; and FIG. 5 is a schematic perspective view of a robotic fire extinguisher according to one embodiment of the present invention;

FIG. 6 is a schematic perspective view of a further form of robotic fire extinguisher according to one aspect of the invention;

FIG. 7 is a schematic perspective view of the device of FIG. 5 in situ on a robotic storage and goods handling system of the type shown in FIGS. 1 to 4;

FIG. 8 is a schematic view of an alternative form of the device in accordance with a further form of the invention showing a device of FIG. 5 or 6 additionally supplied with fire extinguishing material via hose means;

FIG. 9 is a schematic perspective view of the device of FIG. 6 in use in a goods handling and storage system of FIGS. 1 to 4;

FIG. 10 is a schematic side View of the system of FIG. 9 showing the device in use on the storage and goods handling system;

FIG. 11 is a schematic perspective view of a different form of device of FIG. 5 in use on the storage and goods handling system of FIGS. 1 to 4, the device being able to deposit the entire contents of the fire extinguisher carrying cavity at the site of a fire; and FIGS. 12a and 12b is a further form of device in accordance with the invention, the device comprising fire extinguishing pods that explode on contact with fire and cover the fire with fire extinguishing material acting so as to halt the progression of the fire.

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more bins or containers from the stack to access the required products. In this way, multiple products can be accessed from multiple locations in the grid and stacks at any one time.

FIG. 4 shows a typical storage system as described above, the system having a plurality of load handling devices 30 active on the stacks 12. In addition, a robotic service device 50 is positioned on the grid 14.

A first form of robotic service device 50, will now be described with reference to FIGS. 5 to 11.

Referring to FIG. 5, the robotic service device 50 comprises a vehicle 52 having first and second sets of wheels 54, 56 that are engageable with the first and second sets 22a, 22b of rails 22, respectively.

In a similar manner to the operation of the load handling device 30, the first and second sets of wheels 54, 56 of the robotic service device 50 can be moved vertically with respect to the vehicle 50 to engage or disengage the wheels from the corresponding set of rails 22a, 22b. By engaging and driving the appropriate set of wheels the robotic service device 50 can be moved in the X and Y directions in the horizontal plane on the top of the frame structure 14.

The device 50 occupies a single grid space formed by the tracks 22 on the top of the storage system framework. As described above in more detail, each grid space defines a location for a stack 12 of containers 10.

Accordingly, the service device 50 of the invention may be moved under the control of the same utility controlling the load handling devices 30 on the storage system, in to any location above a stack 12 of containers 10 on the storage system.

As can be seen in FIG. 5 the device 50 is further provided with one or more spray device 70 capable of discharging a fire extinguishing material 60. Optionally the one or more spray device may be movable so that the spray device can be directed onto a fire so that the fire extinguishing material is discharged directly onto a fire. Optionally, the device 50 is provided with a camera means 72 to assist with in locating the fire or any other heat source.

The robotic service device 50 may be provided with suitable pumping means to pump the fire extinguishing material, from a tank or supply located within the device, out of the nozzle toward the fire. The directionality of the deployment of the material may be governed by the geometry of the nozzle or spray device. Alternatively it may be computer controlled or remotely but manually controlled by a user located at a control point on the system (not shown).

It will be appreciated that in large storage systems, there are many detection and monitoring systems employed.

These are many and varied and will not be specifically listed here but may include but not be limited to heat detectors, smoke detectors and visual inspection means such as cameras. These detectors may form part of the structural parts of the system or may be deployed on the robotic devices operable on the system.

For example, fire detectors located throughout the storage system continuously monitor the system for signs of fire. The fire detectors can be selected by way of example only from smoke detectors, heat sensors, optical sensors, and audio sensors.

Optionally heat sensors or other detecting means may be carried on the service device 50 and may be used to identify the position of a fire and direct the spray device towards the fire.

The spray device 70 on the service device 50 may be under the control of the central picking system (not shown) and hence activated by any of the detectors operable on the system and in communication with the central control utility of the storage system.

The mechanism of deploying the fire extinguishing material 60 need not be limited to a spray device 70. Any form of nozzle 70 or movable output of the fire extinguishing material tank or supply may be used to direct the material in the direction of the fire.

Optionally, the service device may be provided with sealing means for sealing one or more containers or bins to prevent any fire spreading and vacuum means to remove air from the vicinity of the fire once the fire is contained in a given container or number of containers 10. The sealing means may comprise fire retardant lids capable of engagement with the open top of the uppermost container 10 in the stack 12. Alternatively, the sealing means may comprise any other suitable member suitable for containing the fire within a stacked container 10. Furthermore, the sealing may comprises means for sealing larger sections of the storage system when deployed, for example fire blankets or the like.

In the event of a fire detector being activated one or more robotic service device 50 is moved on the grid 14 to the location of the fire under the control of the central control utility, the camera means 72 of the service device 50 may be used to view the situation from a control position (not shown).

Furthermore, it will be appreciated that the service device 50 may be provided with sensor means instead of or in addition to camera means 72 to accurately locate the fire.

At the fire site the service device 50 discharges fire extinguishing material 60 from one or more spray device or other mechanism. Optionally the one or more spray device 70 moves as the fire extinguishing material is discharged to ensure that fire extinguishing material is applied to all areas of the fire.

FIG. 6 shows an alternative form of device 50 capable of carrying multiple different types of fire extinguishing material 60' 60" 60'''. As it will be appreciated, different types of material 60 may be used to extinguish the fire depending on the materials involved. These materials may include but not be limited to fire extinguishing foam, fire extinguishing powder and water or other fire extinguishing liquid. Suitable fire extinguishing materials may be selected from by way of example only powder, foam, fluid, aerosol, gas, pellets, gel, liquid and water. For simplicity these will all be referred to as fire extinguishing materials in the specification but it will be appreciated that this phrase is not limiting.

Optionally the one or more spray device 70 can automatically oscillate as the fire extinguishing material 60 is discharged so that the fire extinguishing material 60 reaches all parts of a fire. Alternatively the movement of spray device 70, as the fire extinguishing material 60 is discharged, may be under the control of a computer utility or program forming a part of the control system of the central picking system (not shown).

FIG. 7 shows a further form of robotic service device 50. In the embodiment shown in FIG. 7, the robotic service device occupies 2×2 grid spaces on the picking system. The remaining features of the device 50 are the same as those described in relation to FIGS. 5 and 6. However, the increased size of the device enables a larger volume of fire extinguishing material to be carried on board the device 50. In this embodiment of the invention, the additional fire extinguishing material carried on board the robotic service device may be sufficient to halt the spread of a small fire that may have started. It will be appreciated that the robotic service device need not occupy 2×2 grid spaces but may occupy 1×2 grid spaces, 2×3 grid spaces or any number of grid spaces. The size of the service device 50 may be selected depending on the size of the storage system, the nature of the materials stored within the system and/or the size of the containers and goods or materials within the system. For example in a chilled storage system in which fruit and vegetables are stored there may only be a requirement for a 1×1 service device 50 comprising fire extinguishing means. Whereas in a large ambient storage system in which the containers 10 are used to store matches or flammable materials such as alcohol, a larger service device 50 may be specified.

In a further embodiment of the invention shown in FIG. 8, the robotic service device 50 may be attached via a hose 74 and a hose reel 76 to a fire extinguishing material supply (not shown), such as a water supply or a foam supply or a supply of any other suitable fire extinguishing material. This enables the device 50 to be employed without carrying the fire extinguishing material 60 in the body of the device. Alternatively, as shown in FIG. 9, a small emergency supply of fire extinguishing material 60 may be carried on board the robotic service device 50 and supplemented by additional material 60 if required. In this embodiment, the hose reel 76 is carried on the edge of the storage system by suitable structural members 80.

As indicated by the arrows in FIGS. 8 and 9, the hose 74 may be transported to any required position on the storage system by a robotic service device 50, X movement being achieved by movement of the hose reel 76 on the structural member 80 and Y movement being achieved by movement of the robotic service device 50.

FIG. 10 shows the robotic fire extinguishing device 50 of FIGS. 8 and 9 as deployed on the storage system. The robotic service device of the type carrying three forms of fire extinguishing material 60 has been moved to a point above a detected fire 100 where deployment of the fire extinguishing material 60 via the spray nozzle 70 will halt or slow down the spread of the fire 100.

FIG. 11 shows a further form of robotic fire extinguishing service device 50 in accordance with the invention.

FIG. 11 more particularly shows a form of device 50 where the fire extinguishing material 60 may be deposited at the site of a fire 100 without using a spray 70 or hose 74 mechanism.

In this embodiment of the invention, the robotic service device 50 comprises a tank 82 of suitable fire extinguishing material 60. The device further comprises means for emptying the contents of the tank 82. The means for emptying the tank 82 may comprise a remotely openable door or remotely pierceable diaphragm (not shown) in the base of the tank 82. Such remote actions may be controlled by a user or by the control utility of the storage system.

Once positioned above the location of a fire 100 and on a signal from the storage system control utility, the contents of the tank 82 is deposited on to the site of the fire 100. Advantageously, the sheer amount of fire extinguishing material deposited in a single action may act so as to extinguish a small fire with relative ease.

FIGS. 12a and 12b show another embodiment of the device 50 in accordance with this form of the invention. In the robotic service device 50 of FIG. 12, a pod or pods 84 of fire extinguishing material 60 are stored in a load carrying portion of the device 50.

Upon detection of a fire 100 in the storage system, the robotic service device 50 carrying the fire extinguishing pods 84 is transported to the location of the fire 100 and the pods 84 deployed from the device 50. On deployment, the pod 84 casing is compromised, or the pod explodes, and the fire extinguishing material 60 contained therein is deployed above the fire. Such fire extinguishing pods 84 may only contain sufficient fire extinguishing material 60 to slow the progress of a fire. However, if the fire 100 is sufficiently smothered it may be possible to move the container 10 containing the fire from the stack 12 to a safe place remote from other goods or materials stored in the storage system. This may particularly be the case in a robotic system for storing and moving larger containers 10.

In the example where the pod or pods 84 contain powder as a fire extinguishing or suppressing material 60 it is likely that the pods 84 may only activate with direct contact with the fire 100 or at high temperature. In this case, it may be necessary to deploy additional service devices to deploy additional fire extinguishing material. It will be appreciated that pods 84 comprise ball or grenade-style extinguishers. Such extinguishers may be manually operated by dropping, rolling or throwing into a fire. It will be appreciated that the ball or pod 84 will self-destruct once in contact with flame, dispersing a cloud of, for example, ABC dry chemical powder over the fire 100 which extinguishes the flame. In known examples of pod-type extinguishers the coverage area is about 5 m2 (54 sq ft). One benefit of this type of fire extinguisher is that it may be used for passive suppression. The pod or ball can be placed in a fire prone area or held within the service device and will deploy if a fire develops, being triggered by heat. Most modern extinguishers of this type are designed to make a loud noise upon deployment.

Advantageously, the pod-type fire extinguisher may be more easily stored within a load handling device until required, for long periods of time if necessary. Furthermore, in certain circumstances transporting large amounts of liquid within a robotic service device may be problematic over long distances, therefore use of pod-type materials may be advantageous.

It will be appreciated that there are many other forms that the service device may take. For example, in a further form of the invention, the service device 50 may comprise a substantially planar vehicle having first and second sets of wheels 54, 56 that are engageable with the first and second sets 22a, 22b of rails 22, of the grid 14 respectively. The planar vehicle 52 being provided with seating means 353 so as to be capable of carrying a user. The service device 50 may be robotically controlled by the picking system control but may also be manually driven by the user (not shown).

In use, the first and second sets of wheels 54, 56 of the service device 50 can be moved vertically with respect to the vehicle 52 to engage or disengage the wheels 54, 56 from the corresponding set of rails 22a, 22b. By engaging and driving the appropriate set of wheels 54, 56, the service device 50 can be moved in the X and Y directions in the horizontal plane on the top of the grid 14.

In this manner, the service device 50 may be deployed on the grid 14 and driven to the fire site. Once in an appropriate position, a conventional fire extinguisher may be used or any of the forms of the invention described above may be used.

It will be appreciated that a single storage system may comprise more than one of the types of fire extinguishing robotic service devices 50. Furthermore, it will be appreciated that different types of fire (for example, electrical, chemical etc) may need to be extinguished with different forms of fire extinguishing material 60. Therefore it may be advantageous for many types of robotic service devices to be in use on very large storage systems.

It will be appreciated that dry powder extinguishing material may comprise sodium bicarbonate, potassium bicarbonate, monoammonium phosphate or any other suitable powder. Furthermore, foam fire extinguishing material may comprise aqueous film-forming foam, alcohol-resistant aqueous film-forming foams, film-forming fluoroprotein foams or any other suitable foam fire extinguishing material. Moreover, in the case where water is used as the fire extinguishing material, the water may be deployed as a spray, a mist or a stream and may be deployed under pressure. Other forms of fire extinguishing material may be used such as halons, halon-replacement clean agents, carbon dioxide or the like. It will be appreciated that depending on the material used, the deployment means will need to be selected accordingly. However, it will be apparent to a person skilled in the art what form of nozzle or spray mechanism is appropriate for which form of material 60.

Advantageously, in all of the examples described above, the robotic fire extinguishing devices 50 in accordance with the invention, may provide sufficient fire extinguishing material to halt or slow the progress of a fire. Furthermore, the above described systems may prevent a sprinkler system deployment. Sprinkler systems can cause extensive damage and often deploy over a much larger area than required for the size of the fire. Such a sprinkler deployment can cause extensive damage to stored goods and to the system as a whole. Furthermore, such a sprinkler deployment may require significant amounts of stored goods to be disposed of at a large cost.

In this manner, in the event of a fire detector being activated one or more service device can be rapidly deployed to locate and if necessary extinguish the fire before it has a chance to spread without the need to await human fire fighters or to stop the whole system to allow fire fighters access. In systems of significant size or those which may be subject to large numbers of false alarms this can represent a substantial decrease in the down time of the system.

The invention claimed is:

1. A robotic picking system, comprising:
   a storage system comprising: two substantially perpendicular sets of rails forming a grid; and stacked containers located beneath the rails of the grid;
   the storage system comprising at least one fire extinguishing robotic service device, the fire extinguishing robotic service device comprising:
   a body defining containing means that contains fire extinguishing material;
   two sets of wheels upon which the body is mounted, a first set of wheels engaging with at least two rails of a first set of rails, a second set of wheels engaging with at least two rails of a second set of rails, one of the first or second set of wheels independently moveable and driveable with respect to the other of the first or second set of wheels such that only one set of wheels engages with the first and second sets of rails at any one time such that movement of the fire extinguishing robotic service device along rails to a first grid point that is over a first column is achieved by driving only the set of wheels engaged with the rails; and a spray device dispensing the fire extinguishing material from the containing means of the fire extinguishing robotic service device, wherein the spray device includes a pump that dispenses fire extinguishing material towards a second grid point such that the fire extinguishing material descends a second column of the storage system within which a fire is located, wherein the first column is adjacent the second column.

2. The system according to claim 1, wherein the fire extinguishing robotic service device further comprises:
a fire detecting means.

3. The system according to claim 1 wherein the fire extinguishing material is selected from a group consisting of gel, powder, foam, aerosol, fluid, gas, pellets liquid and water.

4. The system according to claim 2, wherein the fire detecting means is selected from a group consisting of a smoke detector, a heat sensor, an optical sensor, and an audio sensor.

5. The system according to claim 1, wherein the fire extinguishing robotic service device further comprises:
a camera means providing a vision system to allow observation of a fire remotely.

6. The system according to claim 1, further comprising a hose and a hose reel supplying the fire extinguishing material to the fire extinguishing robotic service device.

7. The system according to claim 6, wherein the hose reel is movably carried on an edge of the system by a structural member.

* * * * *